Nov. 21, 1944.  B. MOORHOUSE  2,363,431
APPARATUS FOR MOLDING PLYWOOD
Filed April 16, 1943  2 Sheets-Sheet 1

INVENTOR.
BEN MOORHOUSE.
BY
Charles H. Brown
ATTORNEY

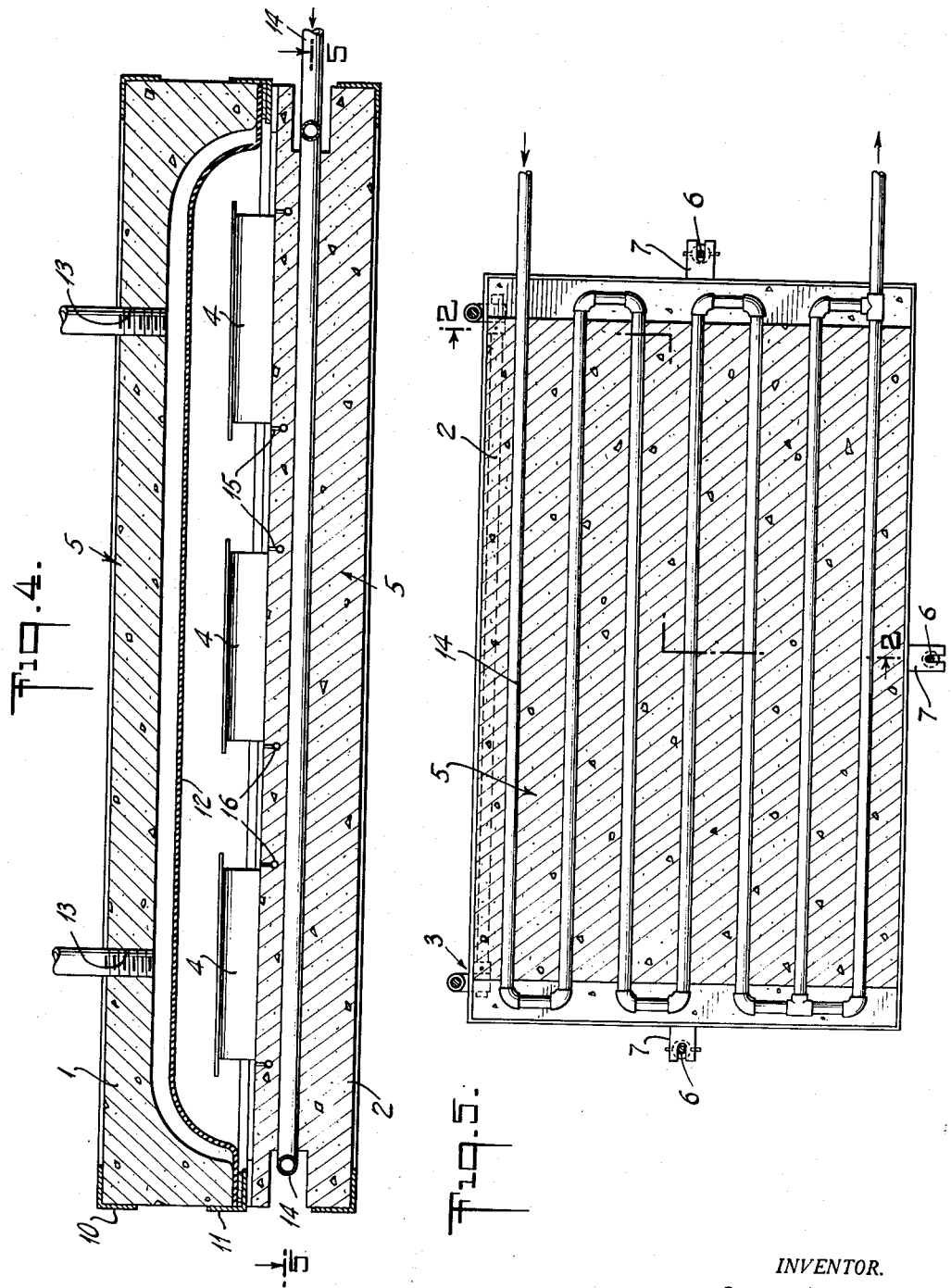

Patented Nov. 21, 1944

2,363,431

UNITED STATES PATENT OFFICE 2,363,431

APPARATUS FOR MOLDING PLYWOOD

Ben Moorhouse, Tuckahoe, N. Y., assignor to Epiphone Inc., a corporation of New York Application April 16, 1943, Serial No. 483,229

1 Claim. (Cl. 144—281)

This invention relates to a method of and apparatus for molding plywood panels.

Heretofore it has been customary to mold plywood panels by placing the plywood in chambers such as autoclaves, employing rubber bags around the material to be molded and using vacuum pumps. Such known methods have also involved introducing live steam directly into the chamber. This procedure entails a number of disadvantages, such as, for example, loss of heat, unduly large apparatus and excessive equipment cost, complicated and involved steps of manipulation, and deleterious effects on the bonding agent between the layers of the panel.

The present invention overcomes the foregoing disadvantages, and has for its primary object to provide a simplified and relatively inexpensive apparatus for molding plywood panels.

Another object of this invention is to enable the molding of plywood inexpensively and more quickly than prior systems.

A further object is to provide a simple method of and apparatus for molding plywood panels which have no deleterious effects on the bonding agent and which remove, to a considerable degree, the tendency for the panel to restore itself to its unmolded condition.

A still further object is to provide inexpensive apparatus for molding plywood panels, which apparatus can be made to be small and compact for accommodating relatively small size molds, and which requires a minimum of heat.

One of the many advantages of the present invention lies in the fact that it is possible to obtain sharp bends or small radius curves in the finished product, which has been extremely difficult if not impossible to obtain in the above mentioned prior systems. Another advantage of the invention is that it is impossible for live steam or for any moisture to contact the plywood panel, and thus deleteriously affect the bonding agent between the layers of the panel.

A more detailed description of the invention follows, in conjunction with drawings wherein:

Fig. 4 is a side vertical section through the apparatus of Fig. 1 when it is in a closed position; and Fig. 5 is a horizontal section through Fig. 4 along the lines 5—5.

Throughout the figures of the drawings, the same parts are labeled by the same reference numerals.

Figure 1:
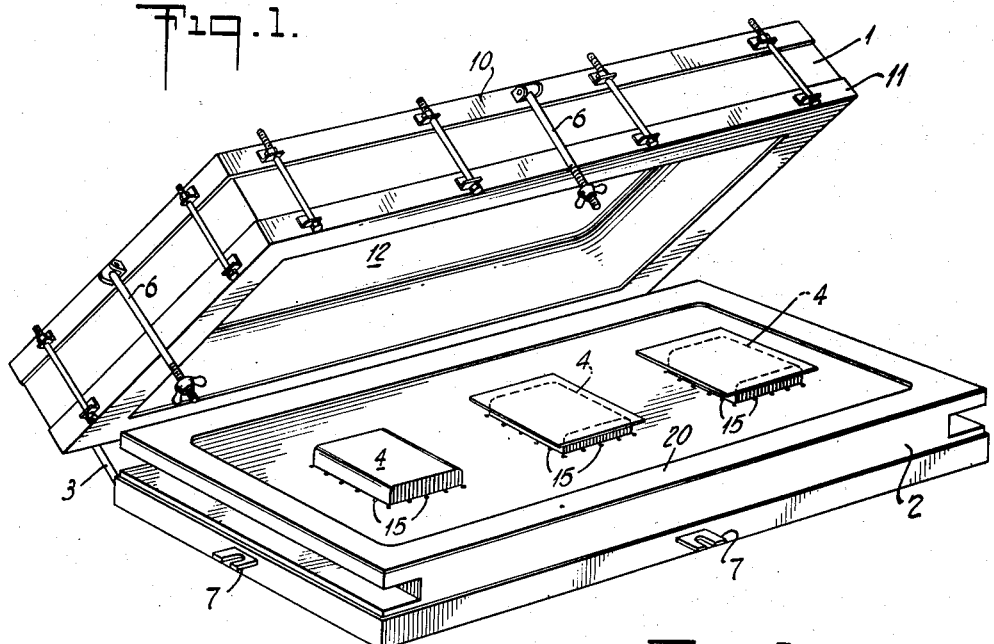
Fig. 1 illustrates in perspective one form of apparatus embodying the invention for molding plywood.

The apparatus embodying the invention and illustrated in the drawings comprises two parts 1 and 2 suitably hinged or pivoted together for convenience at 3. The upper part 1 of Fig. 1 is shown in an open position for enabling the molds 4 and the superposed plywood panels to be introduced into the apparatus. These molds are shown placed upon the flat surface of the lower part 2. Both parts 1 and 2 are made of poured concrete 5 shaped in a manner described in more detail later, although it will be understood that any other suitable material, such as cast iron, can be used instead of concrete.

Figure 2:
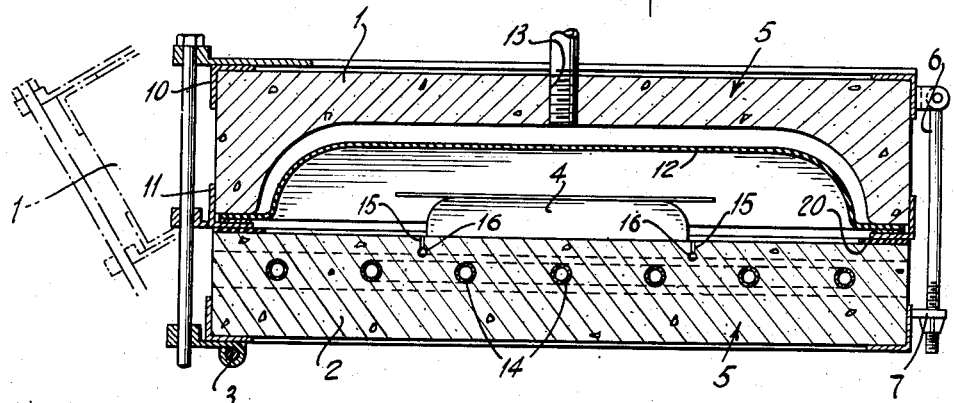
Fig. 2 is an end vertical section through the apparatus of Fig. 1 when it is in a closed position ready for the application of heat and pressure.
Figure 3:
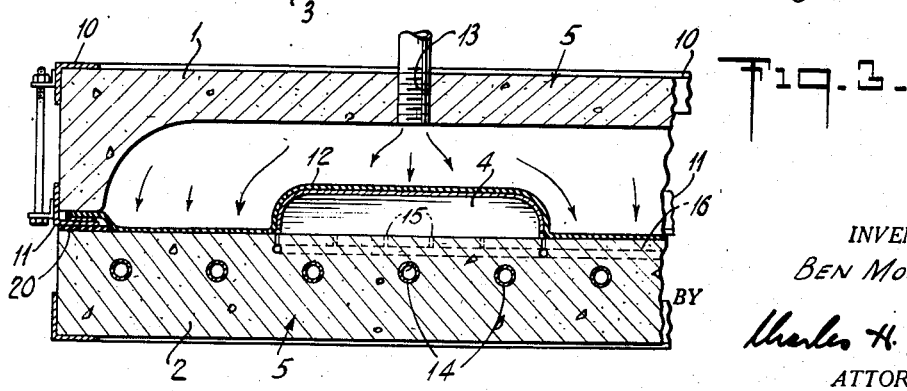
Fig. 3 is a sectional view of only part of Fig. 2, showing the position of the collapsed diaphragm under the application of pressure.

For fastening both parts together in the closed position shown in more detail in Figs. 2, 3 and 4, there is provided a suitable number of rod-like clamps 6 located on the different sides of the part 1 for cooperation with suitable clamp retaining members 7 on the lower part 1.

The upper part 1 is provided with angle irons 10 and 11 on its upper and lower edged surfaces. These angle irons provide anchorage for the rod-like pivot assembly, and the lower angle iron 11 serves as a clamp for the flexible rubber diaphragm 12 in its interior. It should be noted that the interior of upper part 1, namely that surface which confronts the lower part) is hollowed out, so to speak, to accommodate the molds 4 when the apparatus is in closed position. The rubber diaphragm 12 is securely fastened to the upper part in an air tight manner by means of the angle iron 11, as a result of which pressure can be applied to the upper surface of the diaphragm without leakage between the diaphragm and angle iron 11. The solid concrete portion of upper part 1 is provided with two holes 13 for enabling air pressure to be applied to the diaphragm 12 by means of suitable blower means, not shown. The air or gas applied through holes 13 may or may not be heated, as desired.

The lower part 2 is provided with a rubber strip 20 around the edges of its upper surface to serve as a gasket when the two parts 1 and 2 are clamped together, thus sealing the interior of the apparatus. Part 2 is also provided with suitable heating means, such as, for example, steam pipes 14, fed from an external source (not shown). These steam pipes are accommodated in suitable grooves in the lower part 2, and are illustrative of any suitable heating equipment. It should be noted that the steam pipes merely serve to heat the upper surface of the part 2 without introducing any humid air into the closed chamber formed by the interior surfaces of the upper and lower parts 1, 2. If desired, the pipes may be replaced by electric heating wires.

Obviously, the pressure system for supplying pressure to the diaphragm 12 and the heating system for supplying steam to the pipes 14 are equipped with the usual control valves, pressure gauges, and thermometers necessary to achieve their purposes.

For enabling the plywood panel to be bent sharply, in order to take on a small radius where desired, the lower part 2 is provided with bleeder apertures 15 which extend from the upper surface of part 2 upon which the mold is placed to a common outlet or exhaust 16. These bleeders prevent air from being trapped between the diaphragm 12 and the part 2.

In the operation of the apparatus of the invention, the parts 1 and 2 are first opened to assume the position of Fig. 1. Live steam is fed into pipes 14 of the lower part 2. The molds 4 are placed on the upper surface of lower part 2, and the flat plywood panels placed on top of the molds. The parts 1 and 2 are then clamped tightly together to assume the position shown in Figs. 2 and 4. In this closed position, the angle iron 11 presses tightly against rubber strip 20 to provide an air tight seal between these two elements. Air or gas (heated or unheated) is then fed under pressure through air holes 13 in the upper part 1 to force the flexible diaphragm 12 down, in uniform manner, onto the plywood panels to be molded. The molds 4 are heated by the lower part 2, and in turn transfer this heat to the plywood panels in contact therewith. The combination of uniform pressure on the upper part of the diaphragm and the heat applied by the steam pipes 14, forces the plywood to assume the shape of the molds underneath them, as illustrated in Fig. 3. Air pockets between the flexible rubber diaphragm 12 and the lower part 2 are prevented by virtue of the bleeders 15 which are judiciously located around the molds. The pressure is maintained upon the diaphragm for a suitable time interval, determined experimentally, until the plywood panel permanently retains its molded contour.

By way of example only, and not by way of limitation, the temperature of the steam may be from 230° to 300° F.; the pressure applied to the diaphragm may be from forty to sixty-five pounds. The pressure may be continuously applied to the diaphragm for an interval ranging from ten minutes upward, depending upon the thickness and type of plywood panel.

Another advantage of the present invention is that the finished molded plywood product is left with substantially the same moisture content as before being molded.

What is claimed is:

Apparatus for molding plywood comprising a chamber having an upper part and a lower part relatively movable with respect thereto, said parts being made of poured concrete, angle irons around the edges of said parts, means for clamping the two parts of said chamber together in air-tight relation, said lower part having a flat surface for accommodating one or more molds adapted to be placed thereon, steam pipes located in spaces in the poured concrete of said lower part under said flat surface, a flexible rubber diaphragm in the interior of said upper part and secured to the edges of said upper part by said angle irons, a rubber gasket on the edges of said flat surface for sealing the two parts of said chamber, an inlet for said upper part located above said diaphragm for enabling fluid under pressure to be uniformly applied to said diaphragm, said flat surface having bleeder apertures for preventing air pockets from forming between said diaphragm and said flat surface when pressure is applied to said diaphragm.

BEN MOORHOUSE.